W. R. McGOWEN.
AUTOMOBILE ATTACHING BRACKET.
APPLICATION FILED DEC. 16, 1921.
1,411,051.
Patented Mar. 28, 1922.
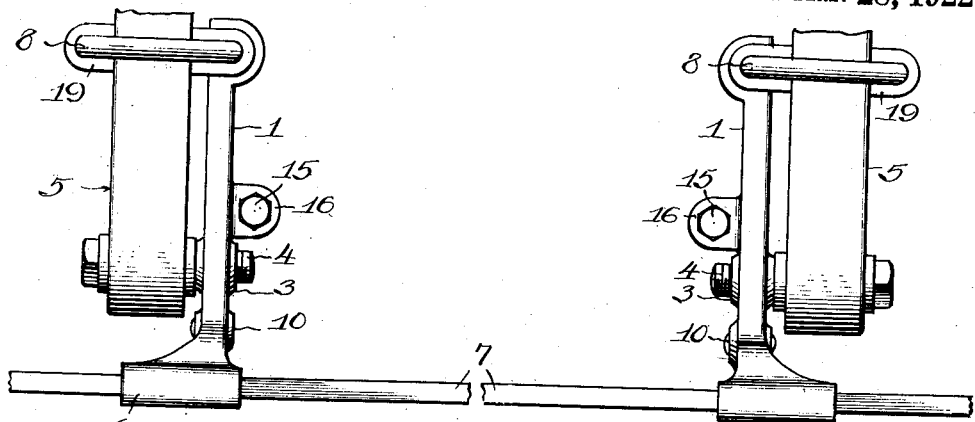
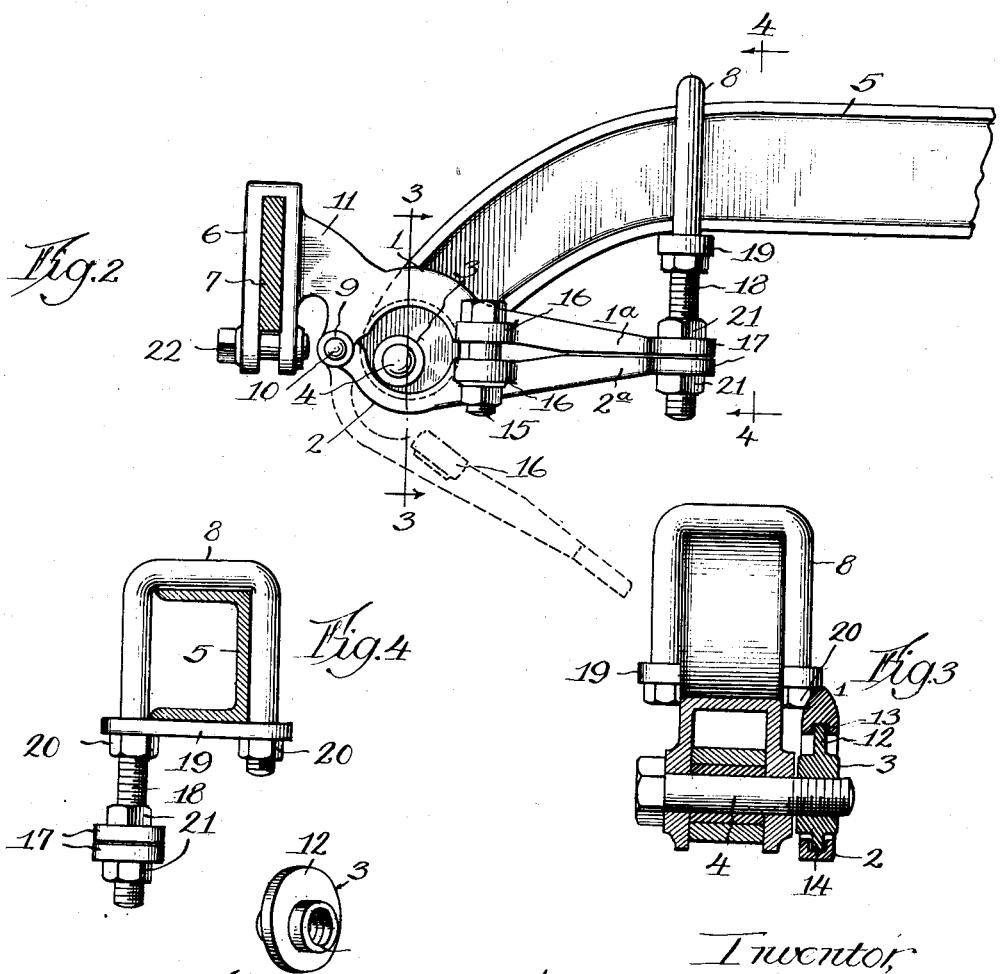
Inventor,
William R. McGowen

UNITED STATES PATENT OFFICE.

WILLIAM R. McGOWEN, OF CHICAGO, ILLINOIS.

AUTOMOBILE ATTACHING BRACKET.

1,411,051.  Specification of Letters Patent.  Patented Mar. 28, 1922.

Application filed December 16, 1921. Serial No. 522,781.

*To all whom it may concern:*

Be it known that I, WILLIAM R. McGOWEN, a citizen of the United States, and a resident of Chicago, in the county of Cook and State of Illinois, have invented certain new and useful Improvements in Automobile Attaching Brackets, of which the following is a specification.

This invention relates to improvements in automobile attaching brackets, and more particularly to devices to be utilized for attaching bumpers to automobiles.

The object of the invention is to provide a new and novel construction for a device of the character described designed to be primarily supported upon the spring bolt ordinarily located at the front or rear ends of the vehicle frame members whereby the bracket may be readily attached to various makes of automobile.

A preferred embodiment of the invention is illustrated in the accompanying drawings, wherein Fig. 1 is a top plan view of the forward ends of the frame members of an automobile with the brackets attached thereto and the bumper supported by said brackets, Fig. 2 is a view in side elevation of the attaching bracket, Fig. 3 is a view in vertical section taken on line 3, 3 of Fig. 2, Fig. 4 is a view in vertical section taken on line 4, 4 of Fig. 2, and Fig. 5 is a perspective view of the flanged collar which is directly mounted on the spring bolt.

In general, the supporting bracket comprises a pair of upper and lower jaw members 1 and 2, respectively, pivotally connected at their forward ends and adapted to clamp around an annularly flanged collar 3 having screw threaded engagement with the spring bolt 4 ordinarily located at the forward end of a vehicle frame member 5 and constituting, together with a nut of standard design, a part of the regular equipment of the automobile. Integral with one of the jaw members, and preferably the upper one 1, is an inverted U-shaped clamp 6 adapted to engage a transverse bar 7 forming a portion of an automobile bumper to be supported by said brackets, and immediately in front of the ends of the frame members. To the rear of the spring bolt 4 the jaw members 1 and 2 are extended in the form of horizontal arms 1ª and 2ª, respectively, adapted to be secured together at their extremities by means of a U-bolt 8, which passes around the frame member 5 and serves to further support the bracket and anchor the same against rotative movement about the axis of the spring bolt.

The jaw members 1 and 2 are preferably of cast or forged metal shaped to form semi-circular shaped jaws which engage and surround the flange sleeve 3, their point of pivotal connection being immediately forward of the spring bolt and having the form of two interfitting ears 9 through which a bolt or hinge pin 10 extends. As before suggested, the clamping member 6 is formed integral with the upper jaw member 1 and is positioned as shown at the forward end of an upwardly inclined intermediate neck portion 11.

The flanged collar 3, as already suggested, is threaded internally to engage the threaded end portion of the spring bolt 4 which ordinarily projects laterally from the frame member 5 and carries a plain nut. Integral with the body portion of the collar is an annular flange 12 having a thickness considerably less than that of said body portion and disposed eccentrically with respect to the axis of the collar. Formed in the semi-circular faces of the jaw members 1 and 2 are grooves 13 and 14, respectively, adapted to engage the annular flange 12 of the collar 3 when said jaw members are clamped in position upon said collar, said complementary flange and grooves providing a secure connection between the parts, such as to prevent axial shifting or displacement therebetween. As the primary means for clamping the jaw members around the collar 3, a bolt 15 is employed, which passes through a pair of complementary ears 16, 16, formed integral with the jaw members and located in vertical alinement immediately beyond and to the rear of the semi-circular jaw portions of said members 1 and 2. The method of mounting of the bracket upon the collar is clearly illustrated in Fig. 2, it being manifest that the jaw members are swung apart as shown in dotted lines, and then brought together around the collar 3, whereupon the bolt 15 is inserted and the jaws brought together in clamping engagement with said collar.

The arms 1ª and 2ª of the jaw members, as already suggested, constitute rearward extensions and terminate at some distance beyond the spring bolt in the form of eyes 17, 17 through which the threaded shank portion 18 of the U-bolt 8 extends, said U-bolt preferably passing around the frame member 5 just beyond the downwardly curved end portion thereof. While any suitable type of U-bolt may be employed, the one disclosed includes a plate 19 passing transversely beneath the frame member 5, the threaded ends of the U-bolt extending through the extremities of said plate and the same drawn tightly against the under side of the frame member 5 by means of nuts 20, 20. It is to be noted that one arm of said U-bolt is extended in length and forms the threaded shank connected with the arms of the bracket. The function of the rearward connection between the bracket and the frame member, as just described, is to anchor said bracket from rotation in a vertical plane of the flange of the collar 3 or the rotation of all of these parts upon the spring bolt 4. By the use of adjusting nuts 21, 21 mounted on the shank 18 of the U-bolt 8 and immediately above and below the ears 17, 17, a bodily rotative adjustment of the bracket may be accomplished in order to insure the vertical positioning of the bumper, this being manifestly determined by the position of the clamping member 6 with respect to the vertical. Furthermore, the adaptability of the bracket is materially increased by the eccentricity of the flange 12 of the collar 3 by rotating the nut on the spring bolt until the proper position is determined, such as to locate the bumper at the desired height from the ground and to insure the proper fitting of the several parts by compensating for any slight variations in frame dimensions and contour.

In order that the bracket may be universal in a comparative sense in its application to automobiles, it is only necessary that the internal diameter of the collar 3 correspond to different size spring bolts that are used in different makes of automobiles. Thus, if the proper sized collar be provided, it is possible to mount the brackets on all makes of cars having substantially the same frame construction, all other parts being of standard size and design with the exception possibly of the U-bolt 8 which can readily be provided to fit different dimensions of frame members 5. This is an important feature of the construction herein described, in that it makes the bracket adaptable to a greater number of makes of automobiles regardless of variations in frame and bolt sizes. Furthermore, the mounting of the brackets is a comparatively simple operation involving merely the removal of the regular nut and the mounting of the flange collar in its place. The operation being completed, the clamping of the bracket upon the collar is readily accomplished, and all necessary adjustments made, and finally, the bumper secured to the bracket by inserting the bars 7 upwardly into the clamping member 6 and inserting and tightening the clamping screws 22 in place. The use of washers may be obviously resorted to in order to secure proper positioning of the collar.

Having described the construction and method of applying the attaching bracket, I claim as my invention:

1. An automobile attaching bracket, comprising pivoted jaw members adapted for clamping engagement with a collar mounted on the spring bolt of an automobile frame member and extended forwardly and rearwardly of said bolt for attachment with a bumper and said frame member respectively.

2. An automobile attaching bracket, comprising pivoted jaw members adapted to be clamped around a collar adapted to replace a nut carried upon the spring bolt at the end of an automobile frame member, one of said jaw members extending forwardly and rearwardly of said bolt, for attachment with a bumper and the frame member respectively.

3. In an automobile attaching bracket, the combination of a collar adapted to be screwed on to a spring bolt located at one end of an automobile frame member and provided with an annular flange, and pivotally connected bracket members adapted to be clamped around said flange.

4. In an automobile attaching bracket, the combination of an annularly flanged collar adapted to replace the nut mounted at the end of the spring bolt of an automobile frame member, and pivotally connected bracket members adapted to have clamping engagement around said collar and provided with complementary grooves interfitting with said flange.

5. An automobile attaching bracket comprising pivotally connected bracket members, a collar adapted to be mounted on the spring bolt of an automobile frame member, said bracket members having clamping engagement with said collar through the medium of a complementary groove and flange.

6. An automobile attaching bracket comprising pivotally connected jaw members, a collar adapted to be mounted on the spring bolt of an automobile frame member, and having an annular eccentric flange surrounding the same, said jaw members being adapted to clamp around said collar and provided with complementary grooves engaging said flange.

7. An automobile attaching bracket comprising a pair of upper and lower pivoted bracket members, an annularly flanged collar mounted on the spring bolt of a vehicle frame member, said bracket members being adapted to be clamped around said collar and provided with an annular groove engaging the flange of said collar, one of said bracket members having a rearwardly extending arm, and means for connecting said arm with said frame member rearwardly of said spring bolt.

8. An automobile attaching bracket comprising a pair of upper and lower pivoted bracket members, a threaded collar adapted to be mounted on the spring bolt of a vehicle frame member and provided with an eccentrically arranged flange, said bracket members being adapted to be clamped around said collar and provided with an annular groove engaging said flange, said jaw members being extended rearwardly from said spring bolt in the form of arms, and means connecting the end of each arm with said frame member.

In witness whereof, I hereunto subscribe my name this 14th day of December, A. D. 1921.

WILLIAM R. McGOWEN.